(12) United States Patent
Karppinen et al.

(10) Patent No.: US 6,885,171 B2
(45) Date of Patent: Apr. 26, 2005

(54) COMPENSATION OF REACTIVE POWER VIA A FREQUENCY CONVERTER

(75) Inventors: Veijo Karppinen, Vaasa (FI); Risto Komulainen, Klaukkala (FI)

(73) Assignee: Vacon Oyj, Vaasa (FI)

( * ) Notice: Subject to any disclaimer, the term of this patent is extended or adjusted under 35 U.S.C. 154(b) by 14 days.

(21) Appl. No.: 10/648,359

(22) Filed: Aug. 27, 2003

(65) Prior Publication Data

US 2004/0061483 A1 Apr. 1, 2004

(30) Foreign Application Priority Data

Aug. 27, 2002 (FI) .............................................. 20021526

(51) Int. Cl.$^7$ ................................................. H02J 3/18
(52) U.S. Cl. ........................... 323/207; 363/41; 363/71; 363/163
(58) Field of Search .............................. 363/39, 41, 58, 363/71, 132, 160, 163; 323/205, 207, 210

(56) References Cited

U.S. PATENT DOCUMENTS

| | | |
|---|---|---|
| 4,344,025 A | 8/1982 | Okuyama et al. |
| 4,647,837 A | 3/1987 | Stemmler |
| 5,134,556 A * | 7/1992 | Courier de Mere ........... 363/39 |
| 5,561,595 A * | 10/1996 | Smith ......................... 363/132 |

FOREIGN PATENT DOCUMENTS

| | | |
|---|---|---|
| DE | 43 27 162 C1 | 7/1994 |
| JP | 8-322153 A | 3/1996 |
| JP | 9-0509 A | 1/1997 |

* cited by examiner

*Primary Examiner*—Jessica Han
(74) *Attorney, Agent, or Firm*—Birch, Stewart, Kolasch & Birch, LLP

(57) ABSTRACT

A method and an apparatus for compensating reactive power and/or harmonic currents in an alternating-current network by means of a frequency converter (1) feeding an alternating-current load (3), which frequency converter has a mains bridge (10) and at least one load bridge (11), said bridges being provided with controllable semiconductor switches. In the method, the reactive power and/or harmonic currents in the alternating-current network are measured, the load of the mains bridge of the frequency converter is measured, and the reactive power and/or harmonic currents in the alternating-current network are compensated by means of the frequency converter when the mains bridge is running at less than full capacity or has no load.

2 Claims, 2 Drawing Sheets

COMPENSATION OF REACTIVE POWER VIA A FREQUENCY CONVERTER

This nonprovisional application claims priority under 35 U.S.C. § 119(a) on Patent Application No. 20021526 filed in Finland on Aug. 27, 2002, which is herein incorporated by reference.

The present invention relates to a method and system for the compensation of reactive power by means of a frequency converter.

An electric power network is often loaded by devices take plenty of (mainly inductive) reactive power. Such devices include e.g. motors and direct-current drives connected directly to the network. Because of reactive power, the current load on the network is greater than the effective load (effective power) alone would require. The greater current load causes various disadvantages, such as greater losses in the network and a need for oversized fuses.

According to prior art, compensation of reactive power is achieved using separate compensating equipment designed for the compensation of reactive power. Inductive reactive power is typically compensated by means of capacitor units. The basic idea of compensation is shown in the vector diagram in FIG. 1, where $U_P$ is phase voltage, $I_{P1}$ is phase current before compensation, $I_C$ is the current of the compensating capacitor and $I_P$ is the compensated phase current. By means of capacitors, a compensating current $I_C$ is set up, which is in opposite phase with respect to the inductive reactive power component $I_{P2}$ comprised in the phase current $I_{P1}$ and therefore compensates it partially or completely.

The use of compensating capacitors has many disadvantages: The compensating capacitive reactive power is constant if the size of the capacitor unit is constant. For this reason, the compensating unit is normally constructed to comprise several stages, which are switched on according to the need. However, due to the stage-wise construction, very seldom is a situation reached where reactive power is completely compensated. In addition, the size and costs of the compensating unit are high, and the compensating unit is susceptible to being overloaded if devices causing high-frequency currents (such as frequency converters) are connected to the network.

Another prior-art possibility for the compensation of reactive power is a reactive power compensating apparatus as disclosed in U.S. Pat. No. 4,647,837, in which a forced-commutation bridge circuit is used to produce a compensating current which is in opposite phase with respect to the reactive component of the phase current and therefore compensates it. In this case, compensation is a stepless process, so it can accomplish complete compensation regardless of load.

Figure 2:
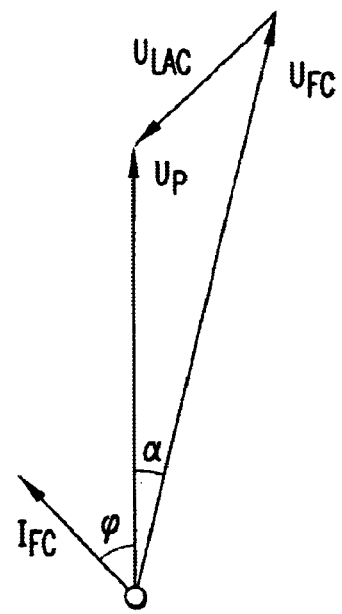

A feature common to all prior-art devices for the compensation of reactive power is that the compensation requires a separate set of equipment exclusively designed for this purpose, thus requiring an extra investment. The object of the present invention is to overcome the drawbacks of prior art and to achieve an arrangement in which compensation of reactive power can be attained without significant additional costs by using a frequency converter connected to the electric network to feed e.g. a cage induction motor. In present-day frequency converters, it is possible to build an active mains bridge (mains inverter) provided with controllable semiconductor switches, such as IGBT (Insulated Gate Bipolar Transistor), which makes it possible to feed braking energy back into the supply network. With an active input bridge, the phase shift angle $\phi$ between the mains current taken by the frequency converter and the network voltage can be adjusted freely by varying the magnitude of the voltage $U_{FC}$ produced by the input bridge and the phase shift angle $\alpha$ with respect to the network voltage $U_P$. The vector diagram in FIG. 2 represents a situation where the mains current $I_{PC}$ taken by the frequency converter is capacitive, in which case it can compensate inductive reactive power in the network. Normally, the power factor cos $\phi$ is set to the value 1, in which case the frequency converter will not take any reactive power from the network. An active input bridge also allows the curve form of the mains current to be adjusted by adding desired harmonic components to the voltage pattern produced by the input bridge. The curve form normally used is the sine curve.

Generally, the frequency converter does not have to be continuously running at full capacity, e.g. in wind mills, combustion cells and similar applications for distributed energy production. The idea of the invention is to use the extra capacity of the mains inverter bridge of the frequency converter to compensate the reactive power and harmonic currents of the supply network, such extra capacity being available when the frequency converter's bridge feeding load is running at less than full capacity or has no load. Therefore, the mains inverter, when used according to the invention, can compensate more or less of the supply network reactive power and current harmonics, depending on the load situation, and thus reduce the average reactive power and harmonics load without significant additional costs.

The details of the features of the method and system of the invention are presented in the claims below.

The invention allows the reactive power and harmonic currents in the network to be compensated without separate compensating equipment and associated extra investments. The compensation is performed in a stepless manner, making it possible to reach a completely compensated situation regardless of variations in the overall load of the supply network.

Figure 1:
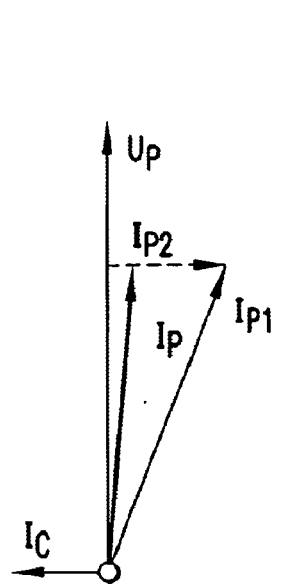
Figure 3:
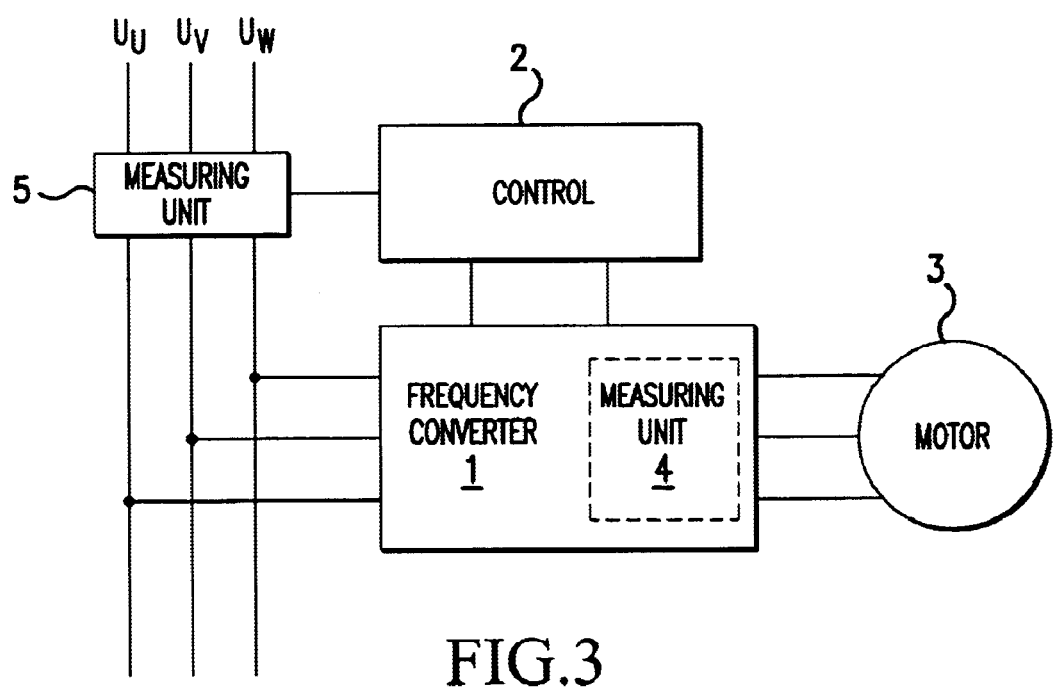
Figure 4:
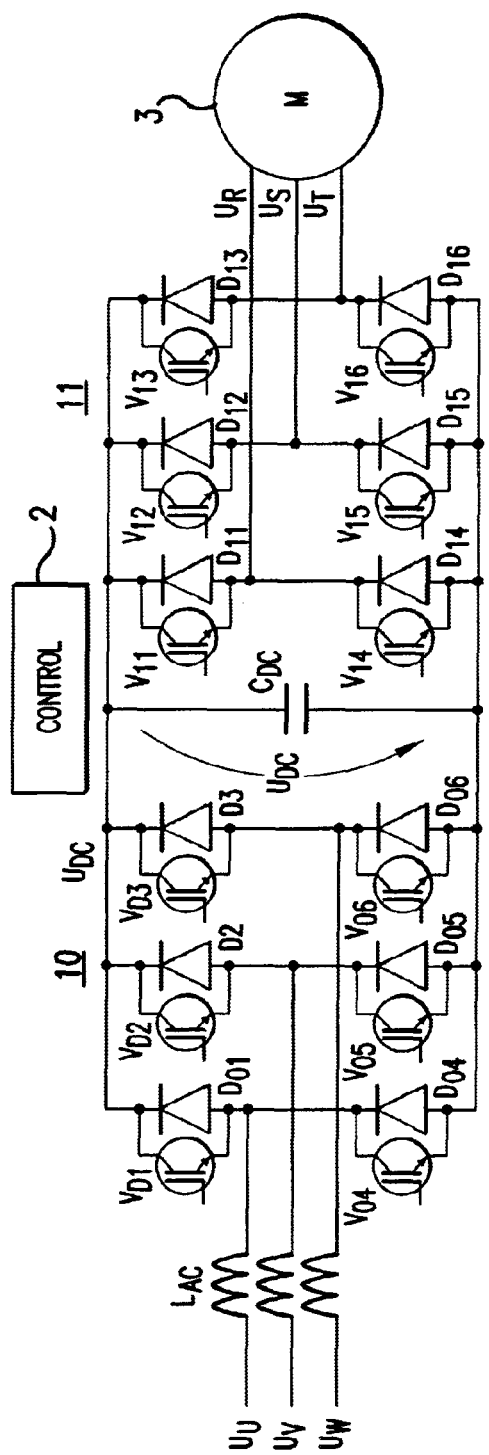
Figure 5:
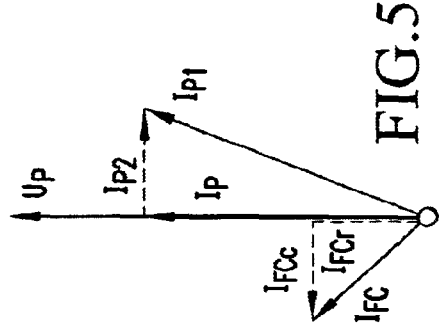

In the following, the invention will be described in detail by the aid of an example with reference to the attached drawings, wherein FIG. 1 presents a vector diagram representing prior-art compensation of reactive power, FIG. 2 presents a vector diagram representing the operation of an active input bridge, FIG. 3 represents an apparatus according to the invention for the compensation of reactive power, FIG. 4 represents the power stage and control unit of a frequency converter comprised in the apparatus and a motor, and FIG. 5 presents a vector diagram representing compensation of reactive power according to the invention.

FIG. 3 presents an apparatus according to the invention for the compensation of reactive power in a three-phase alternating-current network (phase voltages $U_U$, $U_V$, $U_W$). The apparatus comprises a three-phase, voltage-controlled frequency converter 1 provided with a mains bridge and a motor bridge and controlled by a control unit 2. In the frequency converter, both bridges are controlled via pulse-width modulation (PWM), and it has a mains bridge 10 for the rectification of a three-phase supply voltage to produce an intermediate-circuit direct voltage $U_{DC}$, a direct-voltage intermediate circuit provided with a capacitor $C_{DC}$ and a load bridge 11 for inverting the intermediate-circuit direct voltage, producing a three-phase alternating voltage of variable frequency (see FIG. 4). The frequency converter 1 controls a three-phase cage induction motor 3 in such manner that the rotational speed of the motor can be adjusted. The power consumed by the motor and at the same time the load of the frequency converter 1 are measured by a measuring unit 4 provided within the frequency converter.

FIG. 4 presents the power stage of the three-phase frequency converter 1 controlled via pulse-width modulation. The frequency converter comprises a mains bridge 10 rectifying the three-phase alternating voltage of the supply network, comprising the phase voltages $U_U$, $U_V$, $U_W$, into an intermediate-circuit direct voltage $U_{DC}$ and a load bridge (inverter) 11 for inverting the intermediate-circuit direct voltage into a three-phase alternating voltage of variable frequency consisting of phase voltages $U_R$, $U_S$, $U_T$. The load bridge 11 is a full-wave bridge, in which the control unit 13 controls via pulse-width modulation the semiconductor switches (e.g. IGBT) $V_{11}$–$V_{16}$ in each phase (phase R: $V_{11}$, $V_{14}$; phase S: $V_{12}$, $V_{15}$; and phase T: $V_{13}$, $V_{16}$), said switches being connected in inverse-parallel with diodes $D_{11}$–$D_{16}$. Similarly, the mains bridge has for each phase semiconductor switches $V_{01}$–$V_{06}$ (phase U: $V_{01}$, $V_{04}$; phase V: $V_{02}$, $V_{05}$; and phase W: $V_{03}$, $V_{06}$), which are connected in inverse-parallel with diodes $D_{01}$–$D_{06}$.

The active mains bridge 10 of the frequency converter is connected to the supply network via a three-phase choke unit $L_{AC}$. The voltage $U_{LAC}$ acting across the choke unit and determining the magnitude and phase shift angle of the mains current taken by the frequency converter is the same as the voltage difference between the mains voltage $U_P$ and the voltage $U_{FC}$ produced by the mains bridge (see FIG. 2). As the voltage $U_{FC}$ produced by the active mains bridge 10 as well as its phase shift angle α relative to the mains voltage $U_P$ can be freely adjusted via pulse-width modulation, it is also possible in this way to adjust the phase shift angle φ between the mains current and the mains voltage as well as the magnitude of the mains current harmonics. This feature of the active mains bridge is normally used to feed braking energy back into the supply network and to attain a nearly sinusoidal mains current.

According to the invention, the extra capacity of the active input bridge which is available when the bridge feeding the load, e.g. a cage induction motor, is running at less than full capacity (in other words, when the current handling capacity of the input bridge is not entirely needed for the supply of power to the motor connected to the frequency converter) is used to compensate reactive power and harmonic currents in the supply network by adjusting the phase shift angle between the mains current taken by the frequency converter and the mains voltage and adjusting the curve form of the mains current. For this purpose, the network is provided with a measuring unit 5 for measuring reactive power and harmonic currents, said unit 5 being connected to the control unit 2 (see FIG. 3).

FIG. 5 visualizes the principle of compensation of reactive power according to the invention: Here, $I_{FC}$ is the current taken by the frequency converter, and this current can be divided into an effective current $I_{FCr}$ required by the power to be supplied to the motor and a capacitive reactive current $I_{FCc}$. This reactive current can be adjusted steplessly within the limits of the current handling capacity of the frequency converter and it is used for compensating the inductive reactive current component $I_{P2}$ comprised in the total current $I_{P1}$ in the supply network as completely as possible.

It is obvious to the person skilled in the art that different embodiments of the invention are not limited to the example described above, but that they may be varied within the scope of the claims presented below. The invention also works in group drive and line drive applications, where a single mains inverter is used to feed several inverters controlling electric motors.

We claim:

1. Method for compensating reactive power and/or harmonic currents in an alternating-current network by means of a frequency converter (1) feeding an alternating-current load (3), which frequency converter has a mains bridge (10) and at least one load bridge (11), said bridges being provided with controllable semiconductor switches, characterized in that, in the method:

the reactive power and/or harmonic currents in the alternating-current network are measured, the load of the mains bridge of the frequency converter is measured, and the reactive power and/or harmonic currents in the alternating-current network are compensated by means of the frequency converter when the mains bridge is running at less than full capacity or has no load.

2. Apparatus for compensating reactive power and/or harmonic currents in an alternating-current network, said apparatus comprising:

a frequency converter (1) feeding an alternating-current load (3) and comprising a mains bridge (10) and at least one load bridge (11), said bridges being provided with controllable semiconductor switches, and a control unit (2) for controlling the mains and load bridges, characterized in that the apparatus further comprises:

a measuring unit (5) for the measurement of reactive power and/or harmonic currents in the alternating-current network, and a measuring unit (4) used to measure the load of the mains bridge of the frequency converter, and that the control unit (2) controls the mains bridge to compensate the reactive power and/or harmonic currents in the alternating-current network by means of the frequency converter when the mains bridge is running at less than full capacity or has no load.

* * * * *